(12) United States Patent
Robinson et al.

(10) Patent No.: US 7,990,547 B2
(45) Date of Patent: Aug. 2, 2011

(54) APPARATUS AND A METHOD OF MEASURING EROSION OF AN EDGE OF A TURBOMACHINE AEROFOIL

(75) Inventors: Craig Robinson, Durham (GB); Conall Fee, Derby (GB); Stephen Roche, Bunclody (IE); David Bauer, Calgary (CA)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/999,508

(22) PCT Filed: Jun. 16, 2009

(86) PCT No.: PCT/EP2009/004314
§ 371 (c)(1),
(2), (4) Date: Dec. 16, 2010

(87) PCT Pub. No.: WO2010/003512
PCT Pub. Date: Jan. 14, 2010

(65) Prior Publication Data
US 2011/0090514 A1 Apr. 21, 2011

(30) Foreign Application Priority Data
Jul. 9, 2008 (GB) .................................. 0812478.6

(51) Int. Cl.
*G01B 11/24* (2006.01)
(52) U.S. Cl. ............... 356/601; 356/614; 250/559.22; 250/559.35; 250/559.36
(58) Field of Classification Search .......... 356/601–623, 356/237.1–237.5, 394; 250/559.22, 559.35, 250/559.36, 559.29
See application file for complete search history.

(56) References Cited

U.S. PATENT DOCUMENTS

| 3,513,692 | A | * | 5/1970 | Slone | 73/86 |
| 3,699,334 | A | * | 10/1972 | Cohen et al. | 250/492.2 |
| 3,744,911 | A | * | 7/1973 | Stetson et al. | 356/458 |
| 4,025,192 | A | * | 5/1977 | Scholdstrom et al. | 356/4.01 |

(Continued)

FOREIGN PATENT DOCUMENTS
EP 1 351 033 A2 10/2003
(Continued)

OTHER PUBLICATIONS
Hamed et al., "Turbine Blade Surface Deterioration by Erosion," *Journal of Turbomachinery*, 2005, vol. 127, pp. 445-452.
(Continued)

*Primary Examiner* — Hoa Q Pham
(74) *Attorney, Agent, or Firm* — Oliff & Berridge, PLC

(57) ABSTRACT

An apparatus for measuring erosion of an edge of an aerofoil portion of a fan blade includes a laser source to direct light at a position on the edge of the fan blade. A detector detects light reflected from the position on the edge of the fan blade. A computer measures the distance from the laser source to points on the edge of the fan blade to produce a profile of the edge in terms of x and z coordinates. The computer calculates the distances of points on the edge of the fan blade from a centroid of the profile. The computer detects peaks in the distance of points from the centroid of the profile. The computer selects two peaks with the greatest distance therebetween. The computer determines the distance between the two peaks and compares the determined distance and a predetermined distance to determine if there is unacceptable erosion.

20 Claims, 6 Drawing Sheets

U.S. PATENT DOCUMENTS

| | | | |
|---|---|---|---|
| 5,570,186 A | | 10/1996 | Satzger et al. |
| 7,681,325 B2 * | | 3/2010 | Sassatelli et al. ............ 33/784 |
| 2003/0185433 A1 | | 10/2003 | Harding |

FOREIGN PATENT DOCUMENTS

| JP | A-63-246637 | 10/1988 |
|---|---|---|
| RU | 2 089 878 C1 | 9/1997 |
| SU | 1666920 A1 | 7/1991 |

OTHER PUBLICATIONS

International Search Report in International Application No. PCT/EP2009/004314; dated Aug. 21, 2009.

Written Opinion of International Searching Authority in International Application No. PCT/EP2009/004314; dated Aug. 21, 2009.

* cited by examiner

APPARATUS AND A METHOD OF MEASURING EROSION OF AN EDGE OF A TURBOMACHINE AEROFOIL

The present invention relates to an apparatus and a method of measuring erosion of an edge of a turbomachine aerofoil and in particular relates to an apparatus and a method of measuring erosion of an edge of a gas turbine engine aerofoil, eg a leading edge of a fan blade.

The leading edge of a turbofan gas turbine engine fan blade is manufactured with an elliptical profile. During operation of the turbofan gas turbine engine debris, eg airborne particles, entering the intake of the turbofan gas turbine engine strikes the leading edges of the fan blades and erodes the leading edges of the fan blades. The erosion of the leading edges of the fan blades results in a change in the profile of the leading edges of the fan blades from a part circular or part elliptical profile to a flattened profile. This change in the profile of the leading edges of the fan blades results in a loss of efficiency of the fan blades and an increase in the specific fuel consumption and a reduction of the flutter margin of the fan, of the turbofan gas turbine engine.

The leading edge of a fan blade of the turbofan gas turbine engine is periodically inspected to determine if the profile has changed to an unacceptable level to enable removal of the fan blade for re-working/re-profiling of the leading edge of the fan blade and then reinstalling the fan blade or replacement with another fan blade.

A problem with the inspection of the leading edge of the fan blade is that the inspection relies on the judgement of an inspector and therefore the inspection of the leading edge may not be consistent from fan blade to fan blade and/or from inspector to inspector.

Accordingly the present invention seeks to provide a novel method of method of measuring erosion of an edge of a turbomachine aerofoil which reduces, preferably overcomes, the above mentioned problem.

Accordingly the present invention provides a method of measuring erosion of an edge of a turbomachine aerofoil, the method comprising the steps of:—
a) directing light from a source of light in a plane across a position on the edge of the turbomachine aerofoil,
b) detecting the light reflected from the position on the edge of the turbomachine aerofoil,
c) analysing the light reflected from the position on the edge of the turbomachine aerofoil,
d) measuring the distance from the light source to points on the edge of the turbomachine aerofoil at the position on the edge of the turbomachine aerofoil to produce a profile of the edge at the position on the edge of the turbomachine aerofoil in terms of x and z coordinates,
e) calculating the distances of points on the edge of the turbomachine aerofoil from a centroid of the profile,
f) detecting local peaks in the distance of points from the centroid of the profile,
g) selecting the two local peaks with the greatest distance there between,
h) determining the distance between the two local peaks,
i) fitting a first straight line between the two local peaks,
j) fitting second and third straight lines onto both sides of the profile of the edge at the position on the edge of the turbomachine aerofoil,
k) determining the distance between the points of intersection between the first straight line and the second and third straight lines, and
l) comparing the determined distance between the points of intersection between the first straight line and the second and third straight lines and a predetermined distance to determine if the edge of the turbomachine aerofoil has unacceptable erosion.

Preferably step k) comprises using Pythagoras theorem.
Preferably steps a) to l) are repeated at a plurality of positions on the edge of the turbomachine aerofoil.
Preferably steps a) to l) are repeated for all positions on the edge of the turbomachine aerofoil.

The present invention also provides a method of measuring erosion of an edge of a turbomachine aerofoil, the method comprising the steps of:—
a) directing light from a source of light in a plane across a position on the edge of the turbomachine aerofoil,
b) detecting the light reflected from the position on the edge of the turbomachine aerofoil,
c) analysing the light reflected from the position on the edge of the turbomachine aerofoil,
d) measuring the distance from the light source to points on the edge of the turbomachine aerofoil at the position on the edge of the turbomachine aerofoil to produce a profile of the edge at the position on the edge of the turbomachine aerofoil in terms of x and z coordinates,
e) calculating the distances of points on the edge of the turbomachine aerofoil from a centroid of the profile,
f) detecting local peaks in the distance of points from the centroid of the profile,
g) selecting the two local peaks with the greatest distance there between,
h) determining the distance between the two local peaks,
i) comparing the determined distance between the two local peaks and a predetermined distance to determine if the edge of the turbomachine aerofoil has unacceptable erosion.

Preferably steps a) to i) are repeated at a plurality of positions on the edge of the turbomachine aerofoil.
Preferably steps a) to i) are repeated for all positions on the edge of the turbomachine aerofoil.
Preferably steps a) to c) are repeated a plurality of times at the position on the edge of the turbomachine aerofoil and in step d) a plurality of profiles are produced and the plurality of profiles are averaged to produce a single averaged profile of the edge at the position on the edge of the turbomachine aerofoil in terms of x and z coordinates.

Preferably step a) comprises directing laser light from a laser source.
Preferably step a) comprises directing laser light in a curtain of laser light in a plane across a position on the edge of the turbomachine aerofoil.
Alternatively step a) comprise directing laser light in a spot of laser light and traversing the spot of laser light in a plane across a position on the edge of the turbomachine aerofoil.

Preferably step e) comprises converting the profile into polar coordinates.
Preferably the turbomachine aerofoil is a rotor blade or a stator vane.
Preferably the turbomachine aerofoil is a gas turbine aerofoil. Preferably the gas turbine aerofoil is a fan blade or a compressor blade. Preferably the leading edge is part elliptical or part circular.

The present invention also seeks to provide a novel apparatus for measuring the profile of an edge of a turbomachine aerofoil which reduces, preferably overcomes, the above mentioned problem.

Accordingly the present invention provides an apparatus for measuring erosion of an edge of a turbomachine aerofoil, the apparatus comprises a source of light arranged to direct light in a plane across a position on the edge of the turbomachine aerofoil, a detector to detect the light reflected from the position on the edge of the turbomachine aerofoil, means to analyse the light reflected from the position on the edge of the turbomachine aerofoil, means to measure the distance from the light source to points on the edge of the turbomachine aerofoil at the position on the edge of the turbomachine aerofoil to produce a profile of the edge at the position on the edge of the turbomachine aerofoil in terms of x and z coordinates, means to calculate the distances of points on the edge of the turbomachine aerofoil from a centroid of the profile, means to detect local peaks in the distance of points from the centroid of the profile, means to select the two local peaks with the greatest distance there between, means to determine the distance between the two local peaks, means to fit a first straight line between the two local peaks, means to fit second and third straight lines onto both sides of the profile of the edge at the position on the edge of the turbomachine aerofoil, means to determine the distance between the points of intersection between the first straight line and the second and third straight lines and means to compare the determined distance between the points of intersection between the first straight line and the second and third straight lines and a predetermined distance to determine if the edge of the turbomachine aerofoil has unacceptable erosion.

The present invention also provides an apparatus for measuring erosion of an edge of a turbomachine aerofoil, the apparatus comprises a source of light arranged to direct light in a plane across a position on the edge of the turbomachine aerofoil, a detector to detect the light reflected from the position on the edge of the turbomachine aerofoil, means to analyse the light reflected from the position on the edge of the turbomachine aerofoil, means to measure the distance from the light source to points on the edge of the turbomachine aerofoil at the position on the edge of the turbomachine aerofoil to produce a profile of the edge at the position on the edge of the turbomachine aerofoil in terms of x and z coordinates, means to calculate the distances of points on the edge of the turbomachine aerofoil from a centroid of the profile, means to detect local peaks in the distance of points from the centroid of the profile, means to select the two local peaks with the greatest distance there between, means to determine the distance between the two local peaks and means to compare the determined distance between the two local peaks and a predetermined distance to determine if the edge of the turbomachine aerofoil has unacceptable erosion.

Preferably the source of light comprises a laser source to direct laser light.

Preferably the laser source comprises a laser source arranged to direct laser light in a curtain of laser light in a plane across a position on the edge of the turbomachine aerofoil.

Alternatively the laser source comprises a laser source arranged to direct laser light in a spot of laser light and the apparatus comprises means to traverse the spot of laser light in a plane across a position on the edge of the turbomachine aerofoil.

Preferably the turbomachine aerofoil is a rotor blade or a stator vane.

Preferably the turbomachine aerofoil is a gas turbine aerofoil. Preferably the gas turbine aerofoil is a fan blade or a compressor blade. Preferably the leading edge is part elliptical or part circular.

The present invention will be more fully described by way of example with reference to the accompanying drawings in which:—

Figure 1:
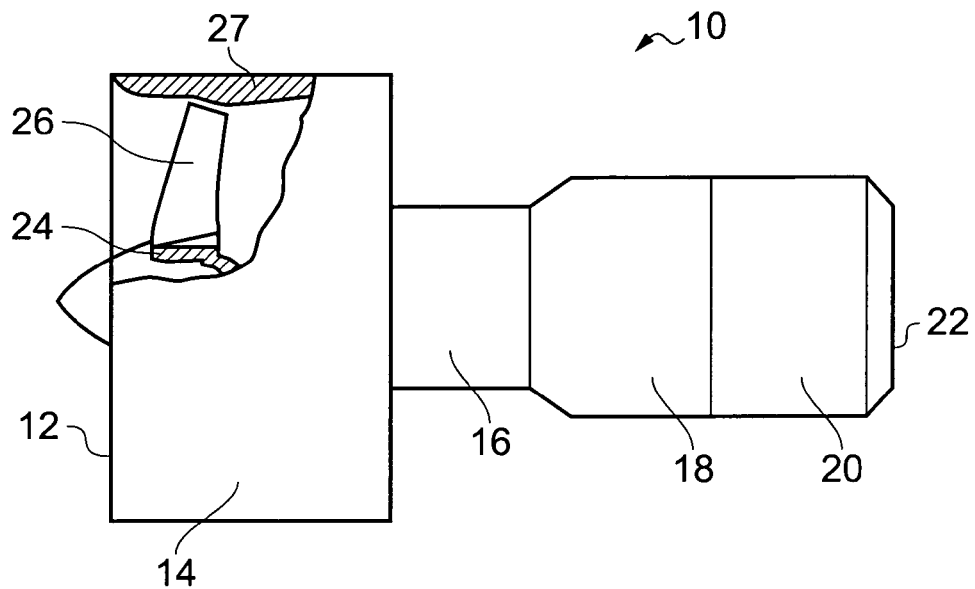
FIG. 1 shows a turbofan gas turbine engine having a fan blade.

A turbofan gas turbine engine 10, as shown in FIG. 1, comprises in flow series an intake 12, a fan section 14, a compressor section 16, a combustion section 18, a turbine section 20 and an exhaust 22. The fan section 14 comprises a fan rotor 24 carrying a plurality of circumferentially spaced radially outwardly extending fan blades 26. The compressor section 16 comprises in flow series an intermediate pressure compressor (not shown) and a high pressure compressor (not shown). The turbine section 20 comprises in flow series a high pressure turbine (not shown), an intermediate pressure turbine (not shown) and a low pressure turbine (not shown). The high pressure turbine is arranged to drive the high pressure compressor. The intermediate pressure turbine is arranged to drive the intermediate pressure compressor and the low pressure turbine is arranged to drive the fan rotor 24 and fan blades 26. The turbofan gas turbine engine 10 operates quite conventionally and its operation will not be discussed further.

Figure 2:
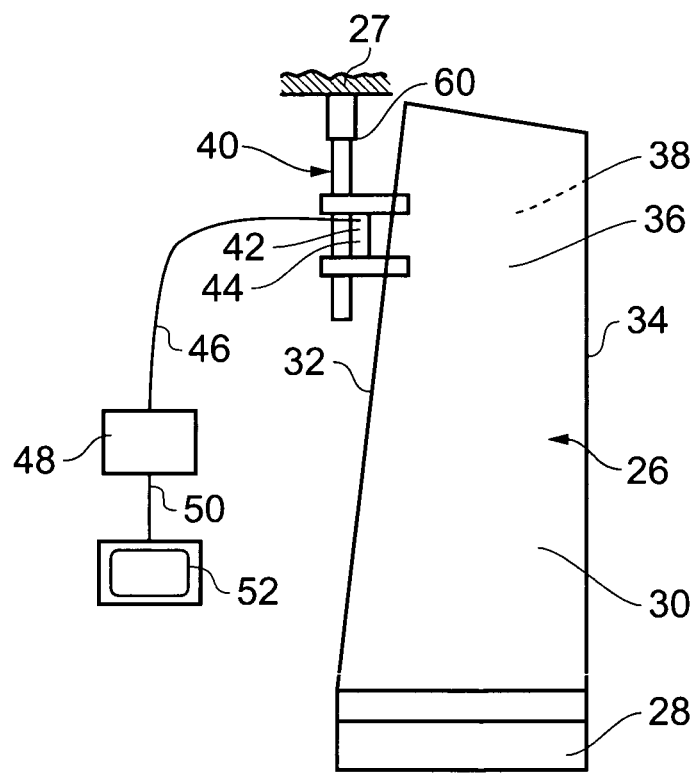
FIG. 2 shows an enlarged view of a fan blade and an apparatus to measure erosion of a leading edge of the fan blade according to the present invention.

A fan blade 26, as shown more clearly in FIG. 2, comprises a root portion 28 and an aerofoil portion 30. The aerofoil portion 30 has a leading edge 32, a trailing edge 34, a convex suction surface 36 which extends from the leading edge 32 to the trailing edge 34 and a concave pressure surface 38 which extends from the leading edge 32 to the trailing edge 34.

Figure 2A:
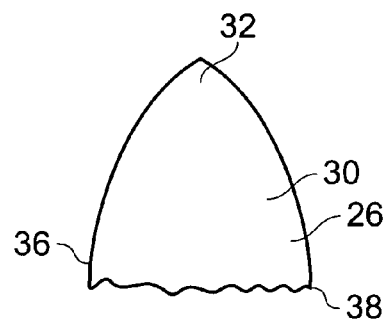
FIG. 2A shows an enlarged cross-sectional view of a part elliptical leading edge of a fan blade.
Figure 2B:
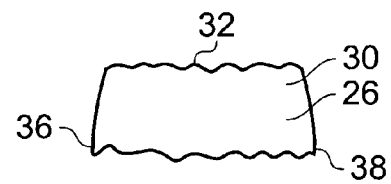
FIG. 2B shows an enlarged cross-sectional view of an eroded leading edge of a fan blade.

As mentioned previously during operation of the turbofan gas turbine engine 10 debris, airborne particles, enters the intake of the turbofan gas turbine engine strikes the leading edges 32 of the fan blades 26 and erodes the leading edges 32 of the fan blades 26. The erosion of the leading edges 32 of the fan blades 26 results in a change in the profile of the leading edges 32 of the fan blades 26 from an elliptical profile, as shown in FIG. 2A to a flattened profile as shown in FIG. 2B. This change in the profile of the leading edges 32 of the fan blades 26 results in a loss of efficiency of the fan blades 26 and an increase in the specific fuel consumption, and a reduction of the flutter margin of the fan, of the turbofan gas turbine engine 10.

Figure 3:
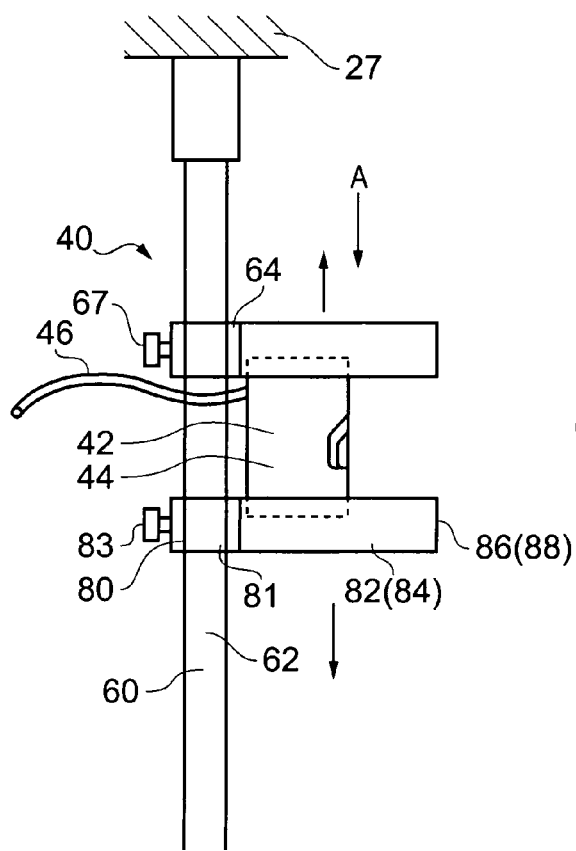
FIG. 3 shows a further enlarged view of the apparatus to measure erosion of a leading edge of the fan blade according to the present invention.

An apparatus 40 for measuring erosion of the leading edge 32 of the aerofoil portion 30 of a fan blade 26, as shown in FIGS. 2 and 3, comprises a source of laser light 42. The source of laser light 42 is arranged to direct laser light in a plane across a radial position on the leading edge 32 of the aerofoil portion 30 of the fan blade 26. A detector 44 is arranged to detect laser light reflected from the radial position on the leading edge 32 of the aerofoil portion 30 of the fan blade 26. The source of laser light 42 and the detector 44 form a common unit in this example and the unit is a Keyence®LJ-G030 2D profiling laser. The detector 44 is arranged to analyse the laser light reflected from the radial position on the leading edge 32 of the aerofoil portion 30 of the fan blade 26. The detector 44 is arranged to measure the distance from the source of laser light 42 to points on the leading edge 32 of the aerofoil portion 30 of the fan blade 26 at the radial position on the leading edge 32 of the aerofoil portion 30 of the fan blade 26 to produce a profile of the leading edge 32 of the aerofoil portion 30 of the fan blade 26 at the radial position on the leading edge 32 of the aerofoil portion 30 of the fan blade 26 in terms of x and z coordinates. The x coordinates are those measured in a direction between the convex suction surface 36 and the concave pressure surface 38 of the aerofoil portion 30 of the fan blade 26. The z coordinates are those measured in a chordal direction between the leading edge 32 and the trailing edge 34 of the aerofoil portion 30 of the fan blade 26. The y direction is a direction radially, or longitudinally, of the aerofoil portion 30 of the fan blade 26.

Figure 4:
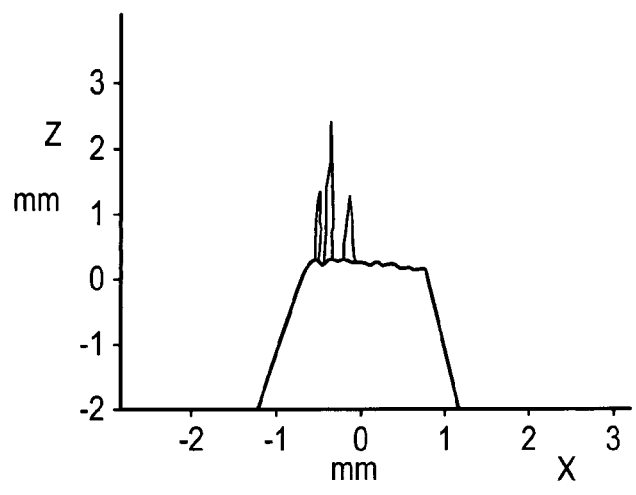
FIG. 4 shows a plurality of measured x versus z profiles at a position on a leading edge of a fan blade overlaid.
Figure 5:
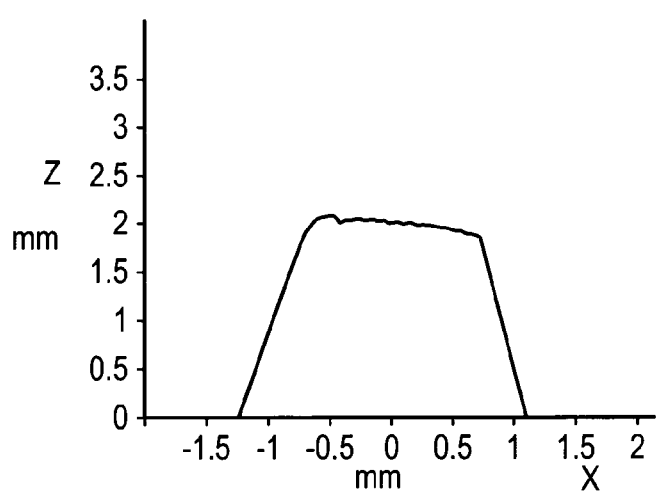
FIG. 5 shows an averaged x versus z profile at a position on a leading edge of a fan blade.

It is preferred that the source of laser light 42 is arranged to direct laser light onto the radial position on the leading edge 32 of the aerofoil portion 30 of the fan blade 26 a plurality of times and the detector 44 is arranged to detect the reflected laser light and to produce a plurality of profiles, one of which is shown in FIG. 4. The plurality of profiles are averaged to produce a single averaged profile of the leading edge 32 of the aerofoil portion 30 of the fan blade 26 at the radial position on the leading edge 32 of the aerofoil portion 30 of the fan blade 26 in terms of x and z coordinates, see FIG. 5. In this example 100 profiles of the leading edge 32 of the aerofoil portion 30 of the fan blade 26 were produced at the radial position on the leading edge 32 of the aerofoil portion 30 of the fan blade 26. Other suitable numbers of profiles may be used to produce an average profile. This is to minimise measurement errors, possibly caused by glare. The vector of x coordinates is generated arbitrarily, starting at zero and continuing at predetermined spacing, 33 micrometre spacing in this example. The profile is shifted towards the origin to facilitate the measurement of the amount of erosion of the leading edge 32. The centroid of the profile is translated in the x direction to align with x=0 and the profile is translated in the z direction such that the highest value of z is at z=2 in this instance.

Figure 6:
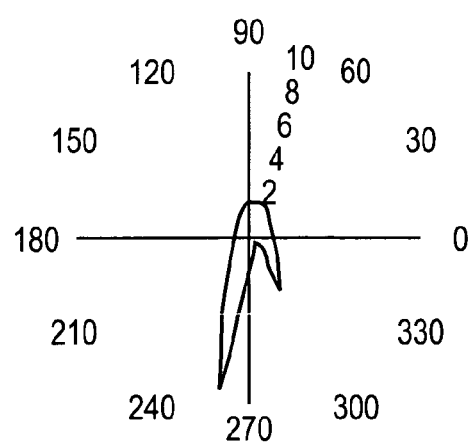
FIG. 6 shows the averaged x versus z profile at a position on a leading edge of a fan blade converted to polar coordinates.

The detector 44 is arranged to send a signal with the profile of the radial position of the leading edge 32 of the aerofoil portion 30 of the fan blade 26 to a computer, or processor, 48 via a cable 45, a controller 46 and a further cable 47. The controller 46 is further connected to a battery (not shown) and controls the apparatus 40. The computer 48 is arranged to calculate the distances of points at the radial position on the leading edge 32 of the aerofoil portion 30 of the fan blade 26 from a point 0 on a centre line of the profile, eg the centroid. The computer 48 converts the profile into polar coordinates, see FIG. 6. This is to remove the dependence on the orientation of the source of laser light. Data points with a radius greater than 10 mm from the origin were set to zero, and this produces a triangular notch under the profile as shown in FIG. 6, to ensure extreme data points do not invalidate the analysis. The r coordinates are those measured radially from the origin.

Figure 7:
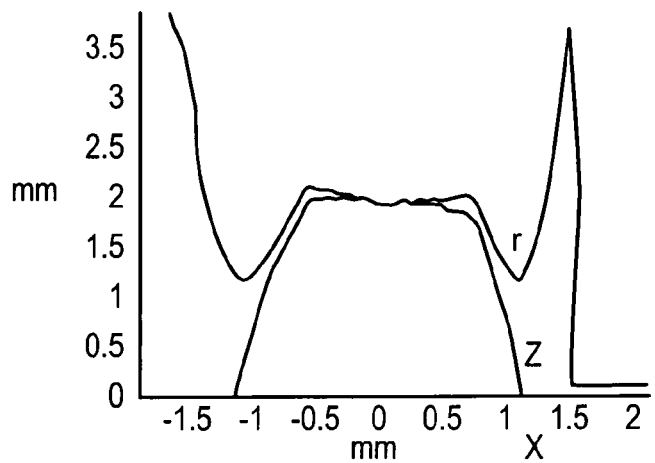
FIG. 7 shows the averaged x versus z profile at a position on a leading edge of the fan blade and the averaged x versus r profile at the position on a leading edge of the fan blade.
Figure 8:
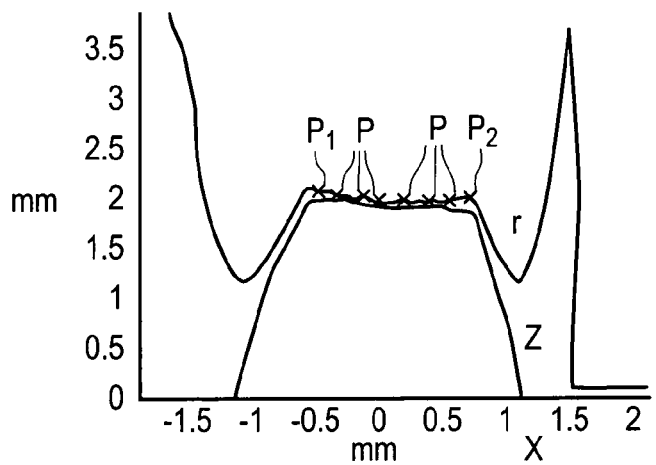
FIG. 8 shows FIG. 7 with points with local maxima in the x versus r profile and the two local maxima furthest apart in the x direction.
Figure 9:
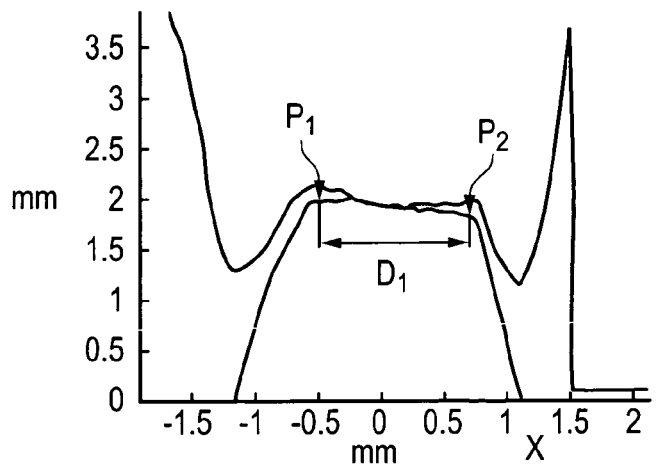
FIG. 9 shows FIG. 8 and measurement of the distance between the two local maxima furthest apart in the x direction.

The computer 48 then plots the x-z data indicated by line z and the x-r data indicated by line r on the same graph, see FIG. 7. The computer 48 detects local peaks P in the radial distance of points from the centroid, the point 0 on the centre line, of the profile and these are marked on the graph, see FIG. 8. The computer 48 select the two local peaks P1 and P2 with the greatest x distance there between, as shown in FIG. 9. These local peaks P1 and P2 correspond approximately to the ends of the flattened leading edge 32, and thus the junction between the flattened leading edge 32 and the convex suction surface 36 and the junction between the flattened leading edge 32 and the concave pressure surface 38, and these appear more pronounced using the x-r plot to allow more reliable detection. The computer 48 determines the distance D1 between the two local peaks P1 and P2 and this distance D1 between the two local peaks P1 and P2 is taken as a first measure of the distance between the junction between the flattened leading edge 32 and the convex suction surface 36 and the junction between the flattened leading edge 32 and the concave pressure surface 38 and hence the amount of erosion of the leading edge 32 of the aerofoil portion 30 of the fan blade 26.

The computer 48 may compare the determined distance D1 between the two local peaks P1 and P2 and a predetermined distance to determine if the leading edge 32 of the aerofoil portion 30 of the fan blade 26 has unacceptable erosion. Thus, the apparatus 40 is actually measuring the extent of flatness of the leading edge 32 of the aerofoil portion 30 of the fan blade 26. Thus if the distance D1 is greater than the predetermined distance there is unacceptable erosion of the leading edge 32 of the aerofoil portion 30 of the fan blade 26.

Figure 10:
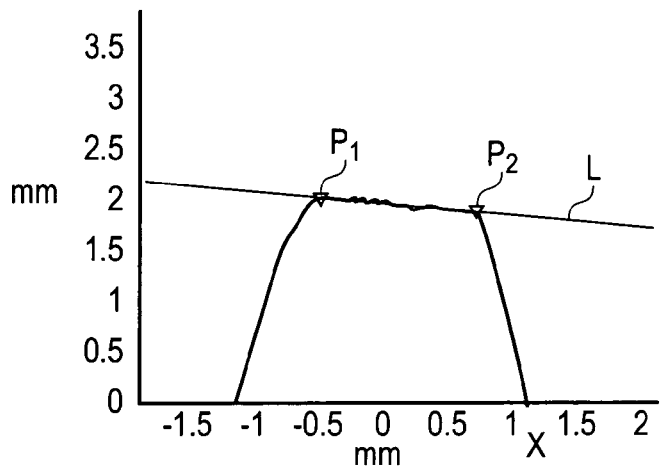
FIG. 10 shows FIG. 9 with a first order polynomial fitted between the two local maxima furthest apart in the x direction.
Figure 11:
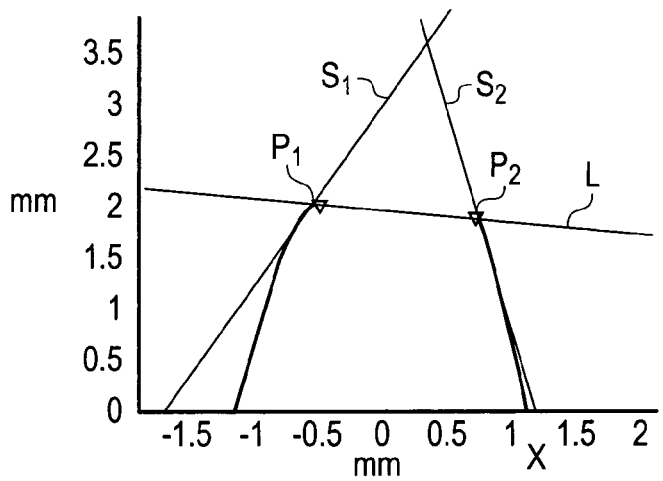
FIG. 11 shows FIG. 10 with straight lines arranged tangent to the un-eroded concave and convex surfaces of the fan blade.
Figure 12:
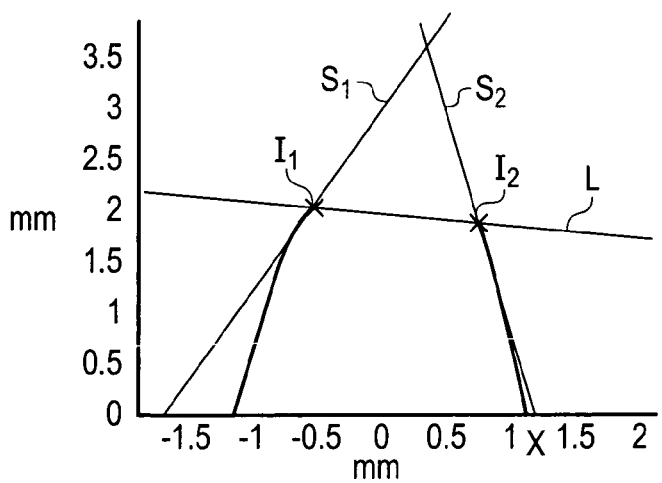
FIG. 12 shows FIG. 11 with two points of intersection between the first order polynomial and the straight lines.
Figure 13:
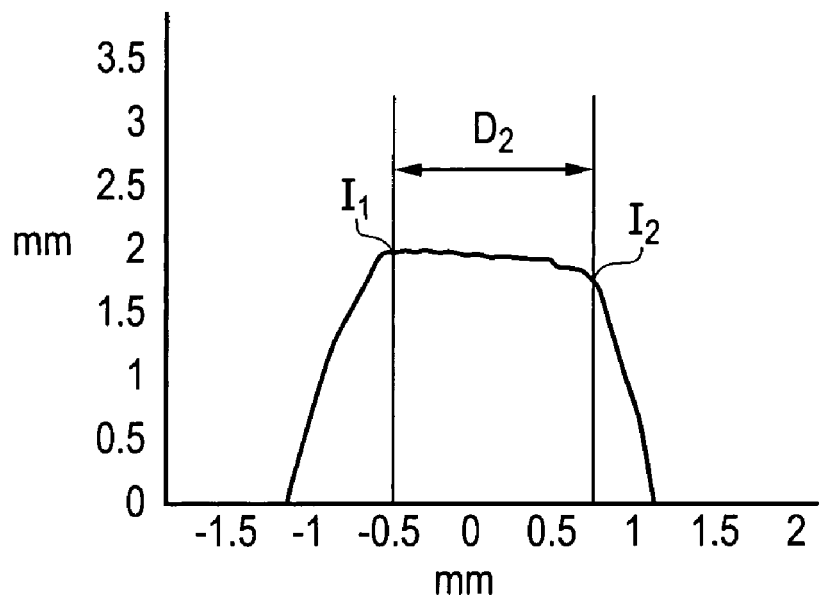
FIG. 13 shows FIG. 12 and measurement of the distance between the two points of intersection in the x direction.

To obtain a slightly more accurate measure of the flattened leading edge 32 and hence the amount of erosion of the leading edge 32 of the aerofoil portion 30 of the fan blade 26 the computer 48 fits a first degree polynomial, fits a straight line using least squares, or other suitable technique, L between the two local peaks P1 and P2 as shown in FIG. 10. The computer 48 then fits straight lines S1 and S2 using least squares, or other suitable method, onto both sides of the profile of the leading edge 32 of the aerofoil portion 30 of the fan blade 26 at the radial position on the leading edge 32 of the aerofoil portion 30 of the fan blade 26, as shown in FIG. 11. The straight lines S1 and S2 are fitted over a relatively short arc with a large radius of curvature. The width of data over which these lines S1 and S2 are fitted is proportional to the distance measured between the points P1 and P2 and the preferably this is about $\frac{1}{5}^{th}$ of the distance measured between points P1 and P2. This is to account for smaller distances between points P1 and P2 being nearer the apex of an unworn ellipse and hence having a smaller local radius of curvature. The computer 48 determines the distance D2 between the points of intersection I1 and I2 between the first degree polynomial L and the straight lines S1 and S2 as shown in FIGS. 12 and 13 and the distance D2 may be measured using Pythagoras theorem. This distance D2 between the points of intersection I1 and I2 is taken as a second, more accurate, measure of the flattened leading edge 32 eg the distance between the junction between the flattened leading edge 32 and the convex suction surface 36 and the junction between the flattened leading edge 32 and the concave pressure surface 38, and hence the amount of erosion of the leading edge 32 of the aerofoil portion 30 of the fan blade 26.

The computer 48 compares the determined distance D2 between the points of intersection I1 and I2 between the first degree polynomial L and the straight lines S1 and S2 and a predetermined distance to determine if the leading edge 32 of the aerofoil portion 30 of the fan blade 26 has unacceptable erosion. Thus, the apparatus 40 is actually measuring the extent of flatness of the leading edge 32 of the aerofoil portion 30 of the fan blade 26. Thus if the distance D2 is greater than the predetermined distance there is unacceptable erosion of the leading edge 32 of the aerofoil portion 30 of the fan blade 26.

The computer 48 is arranged to send a signal to a monitor 52 via a cable 50. The monitor 52 may display the profile of the leading edge 32 of the aerofoil portion 30 of the fan blade 26 at the radial position on the leading edge 32 of the aerofoil portion 30 of the fan blade 26. The monitor 52 may provide the measurement of the distance D1 and may indicate if the distance D1 is greater or less than the predetermined distance or may provide the measurement of the distance D2 and may indicate if the distance D2 is greater or less than the predetermined distance. The monitor 52 may merely indicate that the fan blade 26 should be removed and replaced or removed and re-worked, or re-profiled. Alternatively the distance D2 may be compared to the distance D1 and the difference used as a measure of confidence in the data quality.

As so far described the apparatus has measured for erosion at a single radial position on the leading edge of the aerofoil portion of the fan blade and therefore this procedure is repeated at a plurality of positions on the leading edge 32 of the aerofoil portion 30 of the fan blade 26. For example the procedure is repeated three times. The procedure may be repeated for all radial positions on the leading edge 32 of the aerofoil portion 30 of the fan blade 26. Preferably the procedure is repeated only for those radial positions on the leading edge 32 of the aerofoil portion 30 of the fan blade 26 subjected to the most severe erosive conditions.

Figure 3A:
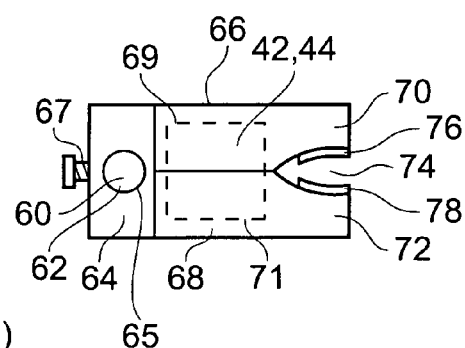
FIG. 3A shows a view in the direction of arrow A in FIG. 3.

The apparatus 40 also comprises a frame 60, as shown in FIGS. 2, 3 and 3A, and the laser light source 42 and detector 44 are movably mounted on the frame 60 such that the laser light source 42 and detector 44 are movable radially along the leading edge 32 of the aerofoil portion 30 of the fan blade 26. The frame 60 is located in the intake 12 of the turbofan gas turbine engine 10 adjacent and upstream of the leading edge 32 of an aerofoil portion 30 of a fan blade 26. The frame 60 may be located on the inner surface of the fan casing 27 at diametrically opposite positions. The frame 60 comprises an elongate member 62 having a circular cross-section and the elongate member may be hollow or solid and may comprise a series of interlocking members or may be a telescopic member. The frame 60 also comprises two rectangular members 64 and 80 which have circular apertures 65 and 81 respectively there-through. The elongate member 62 locates in the apertures 65 and 81 of the rectangular members 64 and 80 respectively. A first end of the laser light source 42 and detector 44 is located between two brackets 66 and 68. The brackets 66 and 68 have recesses 69 and 71 in abutting faces to receive the first end of the laser light source 42 and detector 44. The first ends of the brackets 66 and 68 are secured to the rectangular member 64 and the second ends 70 and 72 of the brackets 66 and 68 respectively taper away from each other to form a gap 74 to receive the leading edge 30 of the aerofoil portion 30 of the fan blade 26. The ends 70 and 72 have resilient members, eg rubber, 76 and 78 on their surfaces defining the gap 74 to abut the convex and concave surfaces 36 and 38 of the aerofoil portion 30 of the fan blade 26. The location, width and angles of the taper on the ends 70 and 72 of the brackets 66 and 68 are arranged to accommodate the twist of fan blade 26. A bolt, or screw, 67 extends through a threaded bore in the rectangular member 64 and the bolt, or screw, 67 is threaded into the threaded bore to lock the rectangular member 64 onto the elongate member 62.

Similarly a second end of the laser light source 42 and detector 44 is located between two brackets 82 and 84. The brackets 82 and 84 have recesses (not shown) in abutting faces to receive the second end of the laser light source 42 and detector 44. The first ends of the brackets 82 and 84 are secured to the rectangular member 80 and the second ends 86 and 88 of the brackets 82 and 84 respectively taper away from each other to form a gap (not shown) to receive the leading edge 30 of the aerofoil portion 30 of the fan blade 26. The ends 86 and 88 have resilient members (not shown), eg rubber, on their surfaces defining the gap to abut the convex and concave surfaces 36 and 38 of the aerofoil portion 30 of the fan blade 26. The location, width and angles of the taper on the ends 86 and 88 of the brackets 82 and 84 are arranged to accommodate the twist of fan blade 26. A bolt, or screw, 83 extends through a threaded bore in the rectangular member 80 and the bolt, or screw, 83 is threaded into the threaded bore to lock the rectangular member 80 onto the elongate member 62.

It is to be noted that the gap between the brackets 82 and 84 are arranged at a different angle to the gap between the brackets 66 and 68 to accommodate the twist in the aerofoil portion 30 of the fan blade 26.

Thus, by unthreading the bolts 67 and 83 on the rectangular members 64 and 80 it is possible to move the laser light source 42 and detector 44 radially, or longitudinally, along the leading edge 32 of the aerofoil portion 30 of the fan blade 26 to different radial positions and then to thread the bolts 67 and 83 to lock the rectangular members 64 and 80 onto the elongate member 62 and then to measure the amount of erosion at different radial positions on the leading edge 32 of the aerofoil portion 30 of the fan blade 26. The rectangular members 64 and 80 may be rotated around the elongate member 62 to match the shape of the leading edge 32 of the aerofoil portion 32 of the fan blade 26.

The bolts, or screws, 67 and 83 may locate in apertures, or slots, located at predetermined positions along the elongate member 62 such that the laser source 42 may be positioned at pre-defined radial positions on the elongate member 62 and hence at pre-defined radial positions on the leading edge 32 of the aerofoil portion 30 of the fan blade 26. It may be possible to simply use pins, or dowels, to locate in the apertures in the rectangular members 64 and 80 and the apertures, or slots, in the elongate member 62 rather than the bolts, or screws. The elongate member 62 ensures the correct radial positioning of the laser source 42 and the base of the elongate member 62 is located with a datum and the datum may be the inner surface of the fan casing 27.

The apparatus 40 is securable to a fan blade 26 without the need for an operator to hold, or support, the weight of the apparatus 40 and minimises movement or vibration during the measurement of erosion of the leading edge 32 of the fan blade 26.

Figure 14:
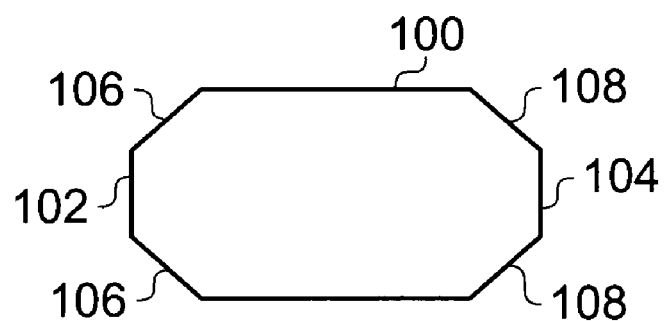
FIG. 14 shows a calibration tool.

FIG. 14 shows a calibration tool 100 for the apparatus 40 for measuring erosion of the leading edge 32 of the aerofoil portion 30 of a fan blade 26. The calibration tool 100 has two flattened edges 102 and 104, to correspond to a leading edge 32 of the aerofoil portion 30 of a fan blade 26. The flattened edges 102 and 104 have known calibrated different widths. The sides 106 of the calibration tool 100 adjacent the flattened edge 102 are arranged at an angle to the flattened edge 102 such that the sides diverge away from the flattened edge 102 again like the leading edge 32 of an aerofoil portion 30 of a fan blade 26. The sides 108 of the calibration tool 100 adjacent the flattened edge 104 are arranged at an angle to the flattened edge 104 such that the sides diverge away from the flattened edge 104 again like the leading edge 32 of an aerofoil portion 30 of a fan blade 26. The apparatus 40 is arranged to transmit laser light onto edge 102 or edge 104 to check it is working satisfactorily, eg recording and analysing data correctly. The sides adjacent the flattened edges must diverge.

Although the present invention has been described with reference to a laser source which directs the laser light in a plane across a radial position on the leading edge 32 of the aerofoil portion 30 of the fan blade 26, it may be possible to use a laser source which directs the laser light in a spot on the leading edge 32 of the aerofoil portion 30 of the fan blade 26. The laser source would then have to be traversed around the leading edge 32 of the aerofoil portion 30 of the fan blade 26 to produce a profile. A suitable spot laser source is a Keyence® LK-G32 and a suitable traverse table is a Zaber KT-LS28M.

Although the present invention has been described with reference to a source of laser light it may be possible to use other suitable sources of light.

Although the present invention has been described with reference to measuring erosion on the leading edge of a fan blade it is equally applicable to measuring erosion on a leading edge of a compressor blade or a leading edge of a turbine blade. The present invention is also applicable to measuring erosion of a trailing edge of a fan blade, a compressor blade or a turbine blade. Although the present invention has been described with reference to gas turbine engine aerofoils, it is also applicable to aerofoils of other turbomachines, eg steam turbines, water turbines, marine propellers.

The invention claimed is:

1. A method of measuring erosion of an edge of a turbomachine aerofoil, the method comprising the steps of:—
    a) directing light from a source of light in a plane across a position on the edge of the turbomachine aerofoil,
    b) detecting the light reflected from the position on the edge of the turbomachine aerofoil,
    c) analysing the light reflected from the position on the edge of the turbomachine aerofoil,
    d) measuring the distance from the light source to points on the edge of the turbomachine aerofoil at the position on the edge of the turbomachine aerofoil to produce a profile of the edge at the position on the edge of the turbomachine aerofoil in terms of x and z coordinates,
    e) calculating the distances of points on the edge of the turbomachine aerofoil from a centroid of the profile,
    f) detecting local peaks in the distance of points from the centroid of the profile,
    g) selecting the two local peaks with the greatest distance there between,
    h) determining the distance between the two local peaks,
    i) fitting a first straight line between the two local peaks,
    j) fitting second and third straight lines onto both sides of the profile of the edge at the position on the edge of the turbomachine aerofoil,
    k) determining the distance between the points of intersection between the first straight line and the second and third straight lines and
    l) comparing the determined distance between the points of intersection between the first straight line and the second and third straight lines and a predetermined distance to determine if the edge of the turbomachine aerofoil has unacceptable erosion.

2. A method as claimed in claim 1 wherein step i) comprises fitting a straight line using a least squares method.

3. A method as claimed in claim 1 wherein step k) comprises using Pythagoras theorem.

4. A method as claimed in claim 1 wherein steps a) to l) are repeated at a plurality of positions on the edge of the turbomachine aerofoil.

5. A method as claimed in claim 1 wherein steps a) to l) are repeated for all positions on the edge of the turbomachine aerofoil.

6. A method as claimed in claim 1 wherein steps a) to c) are repeated a plurality of times at the position on the edge of the turbomachine aerofoil and in step d) a plurality of profiles are produced and the plurality of profiles are averaged to produce a single averaged profile of the edge at the position on the edge of the turbomachine aerofoil in terms of x and z coordinates.

7. A method as claimed in claim 1 wherein step a) comprises directing laser light from a laser source.

8. A method as claimed in claim 1 wherein step e) comprises converting the profile into polar coordinates.

9. A method as claimed in claim 1 wherein the turbomachine aerofoil is selected from the group consisting of a rotor blade and a stator vane.

10. A method as claimed in claim 1 wherein the turbomachine aerofoil is a gas turbine aerofoil.

11. A method as claimed in claim 10 wherein the gas turbine aerofoil is selected from the group consisting of a fan blade and a compressor blade.

12. A method of measuring erosion of an edge of a turbomachine aerofoil, the method comprising the steps of:—
    a) directing light from a source of light in a plane across a position on the edge of the turbomachine aerofoil,
    b) detecting the light reflected from the position on the edge of the turbomachine aerofoil,
    c) analysing the light reflected from the position on the edge of the turbomachine aerofoil,
    d) measuring the distance from the light source to points on the edge of the turbomachine aerofoil at the position on the edge of the turbomachine aerofoil to produce a profile of the edge at the position on the edge of the turbomachine aerofoil in terms of x and z coordinates,
    e) calculating the distances of points on the edge of the turbomachine aerofoil from a centroid of the profile,
    f) detecting local peaks in the distance of points from the centroid of the profile,
    g) selecting the two local peaks with the greatest distance there between,
    h) determining the distance between the two local peaks,
    i) comparing the determined distance between the two local peaks with a predetermined distance to determine if the edge of the turbomachine aerofoil has unacceptable erosion.

13. A method as claimed in claim 12 wherein steps a) to i) are repeated at a plurality of positions on the edge of the turbomachine aerofoil.

14. A method as claimed in claim 12 wherein steps a) to i) are repeated for all positions on the edge of the turbomachine aerofoil.

15. An apparatus for measuring erosion of an edge of a turbomachine aerofoil, the apparatus comprises a source of light arranged to direct light in a plane across a position on the edge of the turbomachine aerofoil, a detector to detect the light reflected from the position on the edge of the turbomachine aerofoil, means to analyse the light reflected from the position on the edge of the turbomachine aerofoil, means to measure the distance from the light source to points on the edge of the turbomachine aerofoil at the position on the edge of the turbomachine aerofoil to produce a profile of the edge at the position on the edge of the turbomachine aerofoil in terms of x and z coordinates, means to calculate the distances of points on the edge of the turbomachine aerofoil from a centroid of the profile, means to detect local peaks in the distance of points from the centroid of the profile, means to select the two local peaks with the greatest distance there between, means to determine the distance between the two local peaks, means to fit a first straight line between the two local peaks, means to fit second and third straight lines onto both sides of the profile of the edge at the position on the edge of the turbomachine aerofoil, means to determine the distance between the points of intersection between the first straight line and the second and third straight lines and means to compare the determined distance between the points of intersection between the first straight line and the second and third straight lines and a predetermined distance to determine if the edge of the turbomachine aerofoil has unacceptable erosion.

16. An apparatus as claimed in claim 15 wherein the source of light comprises a laser source to direct laser light.

17. An apparatus as claimed in claim 15 wherein the turbomachine aerofoil is selected from the group consisting of a rotor blade and a stator vane.

18. An apparatus as claimed in claim 15 wherein the turbomachine aerofoil is a gas turbine aerofoil.

19. An apparatus as claimed in claim 18 wherein the gas turbine aerofoil is selected from the group consisting of a fan blade and a compressor blade.

20. An apparatus for measuring erosion of an edge of a turbomachine aerofoil, the apparatus comprises a source of light arranged to direct light in a plane across a position on the edge of the turbomachine aerofoil, a detector to detect the light reflected from the position on the edge of the turbomachine aerofoil, means to analyse the light reflected from the position on the edge of the turbomachine aerofoil, means to measure the distance from the light source to points on the edge of the turbomachine aerofoil at the position on the edge of the turbomachine aerofoil to produce a profile of the edge at the position on the edge of the turbomachine aerofoil in terms of x and z coordinates, means to calculate the distances of points on the edge of the turbomachine aerofoil from a centroid of the profile, means to detect local peaks in the distance of points from the centroid of the profile, means to select the two local peaks with the greatest distance there between, means to determine the distance between the two local peaks and means to compare the determined distance between the two local peaks with a predetermined distance to determine if the edge of the turbomachine aerofoil has unacceptable erosion.

* * * * *